United States Patent
Shih et al.

(12) 
(10) Patent No.: US 6,954,198 B2
(45) Date of Patent: Oct. 11, 2005

(54) ERGONOMICALLY SHAPED COMPUTER POINTING DEVICE

(76) Inventors: Hung-Ying Shih, 21515 Monrovia St., Cupertino, CA (US) 95014; Paul Ying-Fung Wu, 20090 Edinburgh Dr., Saratoga, CA (US) 95070

( * ) Notice: Subject to any disclaimer, the term of this patent is extended or adjusted under 35 U.S.C. 154(b) by 6 days.

(21) Appl. No.: 10/411,287

(22) Filed: Apr. 11, 2003

(65) Prior Publication Data

US 2003/0206152 A1 Nov. 6, 2003

Related U.S. Application Data

(60) Provisional application No. 60/376,877, filed on May 2, 2002.

(51) Int. Cl.[7] .................................................. G09G 5/08
(52) U.S. Cl. ........................ 345/163; 345/156; 345/161
(58) Field of Search ................................. 345/163, 156, 345/160, 164, 167, 172, 161

(56) References Cited

U.S. PATENT DOCUMENTS

| | | | | |
|---|---|---|---|---|
| 5,576,733 A | * | 11/1996 | Lo | 345/163 |
| 5,648,798 A | * | 7/1997 | Hamling | 345/163 |
| 5,894,303 A | * | 4/1999 | Barr | 345/163 |
| 6,128,006 A | * | 10/2000 | Rosenberg et al. | 345/163 |
| 6,262,715 B1 | * | 7/2001 | Sawyer | 345/163 |
| 6,362,811 B1 | | 3/2002 | Edwards et al. | 345/163 |
| 6,377,245 B1 | * | 4/2002 | Park | 345/163 |
| 6,577,298 B2 | * | 6/2003 | Krog | 345/161 |
| 2001/0010515 A1 | | 8/2001 | Gordon | 345/163 |

OTHER PUBLICATIONS

3M Renaissance Mouse (http://www.3m.com/cws/renmouse.html).

* cited by examiner

*Primary Examiner*—Guy Lamarre
*Assistant Examiner*—Fritz Alpyonse
(74) *Attorney, Agent, or Firm*—Jim Zegeer

(57) ABSTRACT

A computer pointing device that functions electronically as a mouse with a preferred shape that looks like the top of an upright hawk, permitting ergonomic holding by the whole palm in a naturally upright position during operation, including moving the cursor, turning the scroll wheel, and clicking the buttons.

7 Claims, 4 Drawing Sheets

ERGONOMICALLY SHAPED COMPUTER POINTING DEVICE

REFERENCE TO RELATED APPLICATION

The present application is the subject of provisional application Ser. No. 60/376,877 filed May 2, 2002 and entitled ERGONOMICALLY SHAPED COMPUTER POINTING DEVICE.

BACKGROUND OF THE INVENTION

1. Field of the Invention

This invention relates generally to computer pointing devices, specifically to an ergonomically shaped computer mouse.

2. Prior Art

The mouse is a common computer pointing device that allows the user to move the cursor on a computer screen by moving the pointing device on a surface, momentarily click one of the buttons for effecting certain programmed command, click and hold one of the buttons for certain dragging operations, and turn an optional scroll wheel for conveniently scrolling certain windows.

There have been many attempts in offering a mouse that is ergonomic and alleviates Repetitive Strain Injury, or RSI.

U.S. Patent Application Publication US2001/0010515 A1, Aug. 2, 2001 by Gordon, proposes an ergonomic mouse that allows gripping with a pinching action between the thumb and opposing fingers while the mouse is in the U-shaped opening formed in the hand when in a neutral and unflexed condition with the little finger and the heel of the palm opposite the thumb resting upon a work surface.

3M Renaissance Mouse (http://www.3m.com/cws/renmouse.html) has a shape of a slanted stick with dual-buttons positioned at the top of the stick.

U.S. Pat. No. 6,362,811 Mar. 26, 2002 Ergonomic Computer Mouse by Edwards et al proposes slanting the mouse surface by about 50 degrees from the horizontal plane.

U.S. Pat. No. 5,576,733 Nov. 19, 1996 Ergonomic Computer Mouse by Lo also proposes a slanted mouse surface.

U.S. Pat. No. 6,262,715 Jul. 17, 2001 Ergonomic Computer Mouse by Sawyer proposes an upstanding base with arm extensions for effecting button-clicking.

U.S. Pat. No. 5,894,303 Apr. 13, 1999 Computer Mouse and Shell Therefore by Barr proposes a shape that is to be held like a twisted cup.

SUMMARY OF THE INVENTION

The present invention provides superior ergonomic features over the prior art ergonomic mice by providing full support for all fingers, inner palm surface, and bottom palm surface, with fingers in their naturally curled positions. The invention also allows easy lifting by the combined hooking action of the thumb and index finger.

The buttons and scroll wheel are designed with protrusions from the general surface, such that they are contacted by the inner finger joint surfaces, instead of the surfaces of the finger tips in prior art. When the fingers click the buttons or turn the scroll wheel, the invention allows the fingers an inward hooking motion towards the palm.

In addition, the invention allows the thumb or other fingers to turn the scroll wheel with a sideway rubbing action of the inside of the joint.

The invention allows the little finger and the base of the palm to be comfortably half resting on the work surface and half pressed against the base of the device.

Overall, the invention provides flexible fitting to a wide range of hand or palm sizes.

All the advantages shown provide full ergonomic computer pointing operation for the user, leading to a long-term injury-free usage.

Summarizing, the salient features of the shape include: 1) A near oval base with the long axis of the oval in general alignment with the direction of the forearm, 2) A cone rising above the base that fits the palm when held, 3) A top tip that tilts towards the front, 4) Buttons and scroll wheel that are located conveniently close to the joints of the user's fingers.

The shape promotes ergonomic computer pointing operations, in ways including: 1) allowing the hand to maintain a natural upright position, 2) allowing all five fingers to be naturally curved inward while the whole palm is holding the device, 3) allowing the little finger and the base of the palm to be half resting on the work surface and half pressed against the base of the device, 4) effecting button-clicking and scroll-wheel-turning by the outermost joints of the thumb and fingers, 5) the thumb turning the scroll wheel with a sideway rubbing action of the inside of the knuckle, 6) clicking the buttons and turning the scroll wheel promoting an inward hooking of the fingers towards the palm, 7) easy lifting by a natural hooking-hold by the thumb and the index finger, 8) flexible fitting and support for all five fingers and the palm surfaces for a wide range of hand or palm sizes.

BRIEF DESCRIPTION OF THE DRAWINGS

The above and other objects, advantages and features of the invention will become more apparent when considered with the following specification and accompanying drawings wherein.

DESCRIPTION OF THE INVENTION

Figure 1:
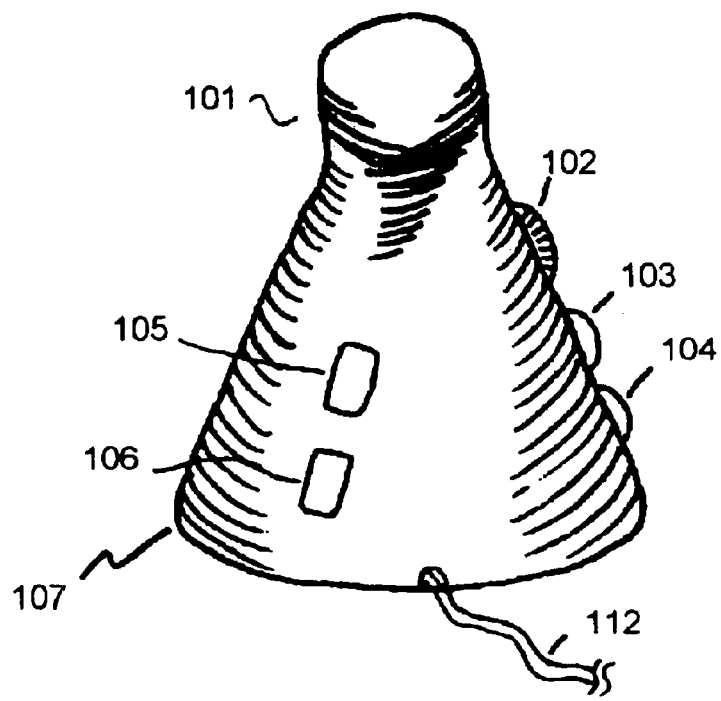
FIG. 1 is a front view of the ergonomically shaped computer pointing device.
Figure 2:
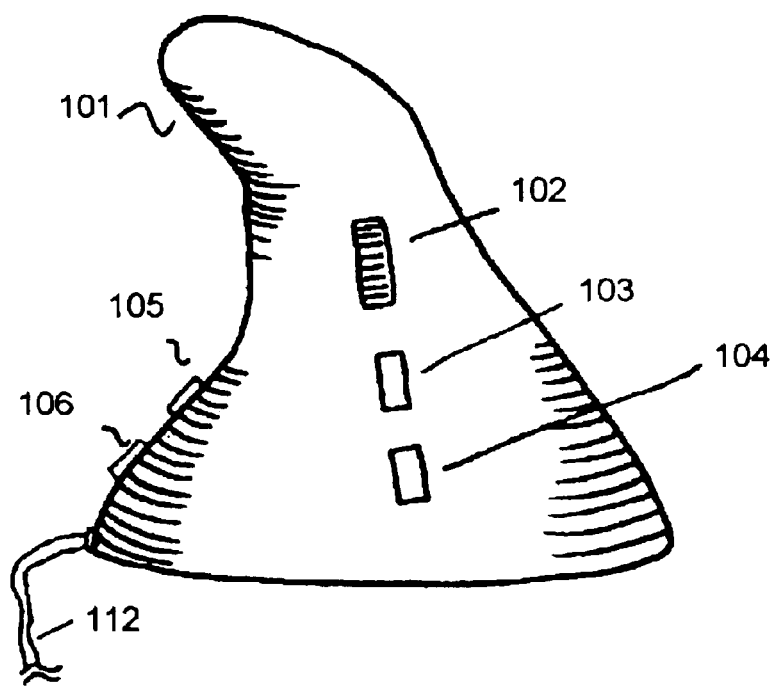
FIG. 2 is a left side view of the ergonomically shaped computer pointing device.

The ergonomically shaped computer pointing device incorporating the present invention is shown at various angles and with or without showing the operator's hand from FIG. 1 to FIG. 8. Electrical functions of the invention as a computer pointing device is the same as those of the modern-day computer mouse, which allows the user to move the cursor on the monitor or display (not shown), turn the scroll wheel, and click the various buttons as necessary actions for interacting with the computer; and hence, it is not necessary to describe these electrical aspects.

Pointing device 101 is shown as a right-handed version and 113 is shown as a left-handed version. It is also very feasible to design a version that is ambidextrous. That is, a design that can be used by either hand.

Scroll wheel 102, located near the neck of the pointing device on the left side, is to be operated by the thumb using the inner joint 108 as contact and rubbing area. The thumb moves in a sideway motion for rotating the scroll wheel. Buttons 103 and 104, located along the left side of the pointing device, are designed to be operated by the thumb's inner joint 108 in a pressing action. Button 104 is optional in a simplified design. The locations of scroll wheel 102 and buttons 103 and 104 may be swapped in different embodiments.

Buttons 105 and 106 are located on the front side of the pointing device, possibly slightly away from the center line for convenient right hand (or respectively, left hand) operation.

Buttons 105 and 106 are optional in a simplified design.

Electrical cord 112 connects the pointing device to the computing system, be it a personal computer or a gaming console or any other electronic device that can utilize a pointing device input. In a wireless embodiment, the cord 112 is not present and its function is substituted by a radio wave, optical, sonic, or any other feasible interface medium.

The tip of the pointing device is designed to be tilting forward for its function, allowing easy grip and lifting by the gripping hand, and its form. It is also feasible to vary the shape of the tip, for example like a mushroom head without sacrificing the utility of the pointing device.

Figure 3:
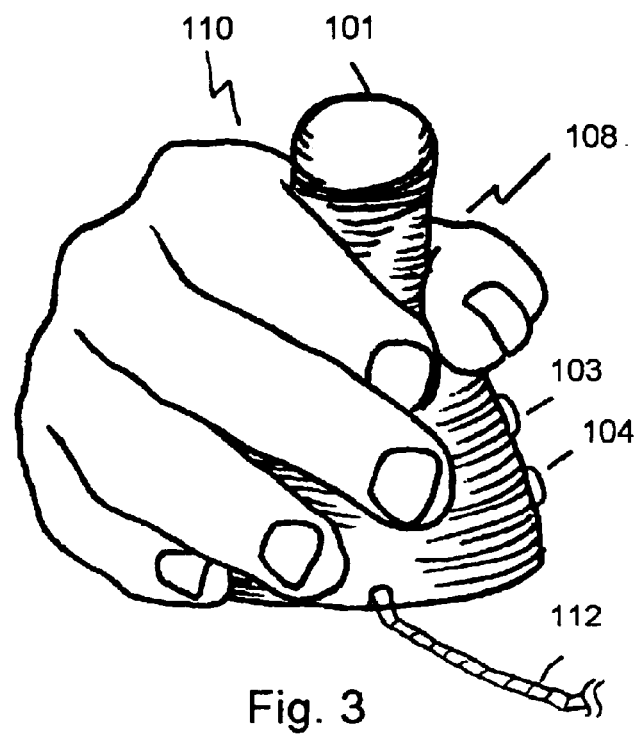
FIG. 3 shows a hand holding the ergonomically shaped computer pointing device.
Figure 4:
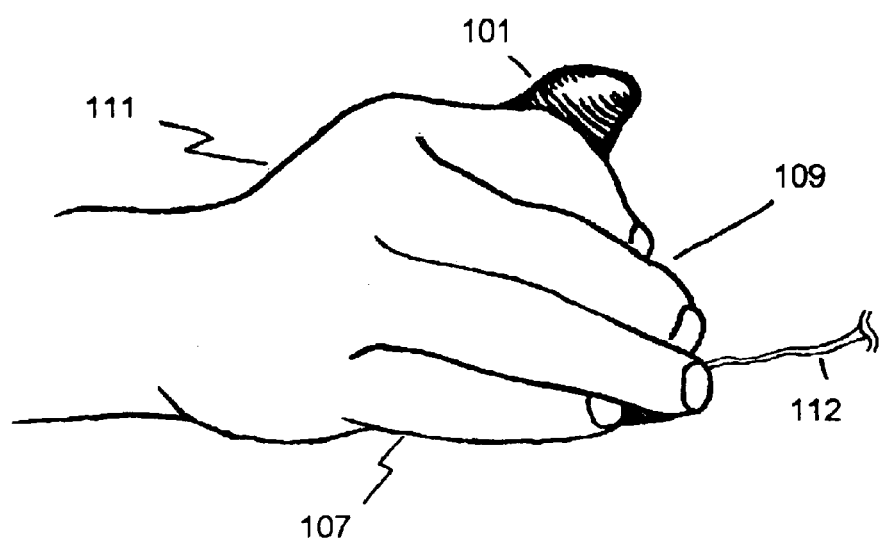
FIG. 4 is a right side view of hand holding the ergonomically shaped computer pointing device.
Figure 5:
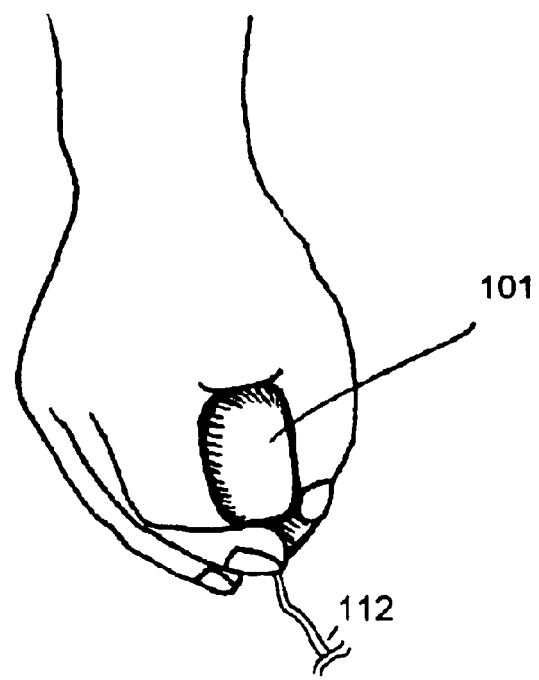
FIG. 5 is a top view of hand holding the ergonomically shaped computer pointing device.
Figure 8:
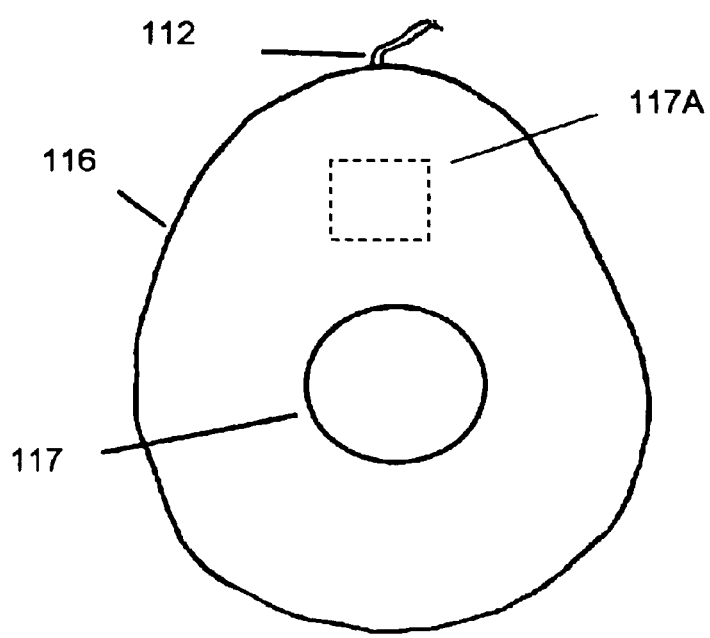
FIG. 8 is a bottom view of the ergonomically shaped computer pointing device.

The base 116, seen from bottom view as shown in FIG. 8 of the pointing device, is approximately an oval shape with its long axis in line with the direction of the forearm. More precisely speaking, the shape is a pear-like shape with the smaller end at the front side. 117 is an approximate location at the bottom 116 of the pointing device where a moving ball or an optical sensor can be placed for sensing the X-Y movement. Base edge 107 allows intimate contact to the little finger and the base of the palm, while allowing the little finger and the base of the palm to be contacting and sliding against the work surface at the same time. The hand, including the palm and the fingers, comfortably contacts the pointing device completely as shown in FIG. 3. Contact area 110 is the contacting area between the pointing device and the U-shape formed by the thumb and the index finger. 108 is the center region of contact between the thumb and the pointing device. Contact area 107 is for the little finger and the base of the palm. The whole inner palm, not shown in the figures, is also in general contact with the pointing device surface. This is a very natural upright and ergonomic position for the hand and the forearm. The main conic surface of the pointing device is forward tilting by approximately 20 to 45 degrees from an absolute upright position with respect to the base 116. The profile is clearly shown by FIG. 1 in a front view and FIG. 2 in a side view. FIG. 5 shows a top view.

Figure 6:
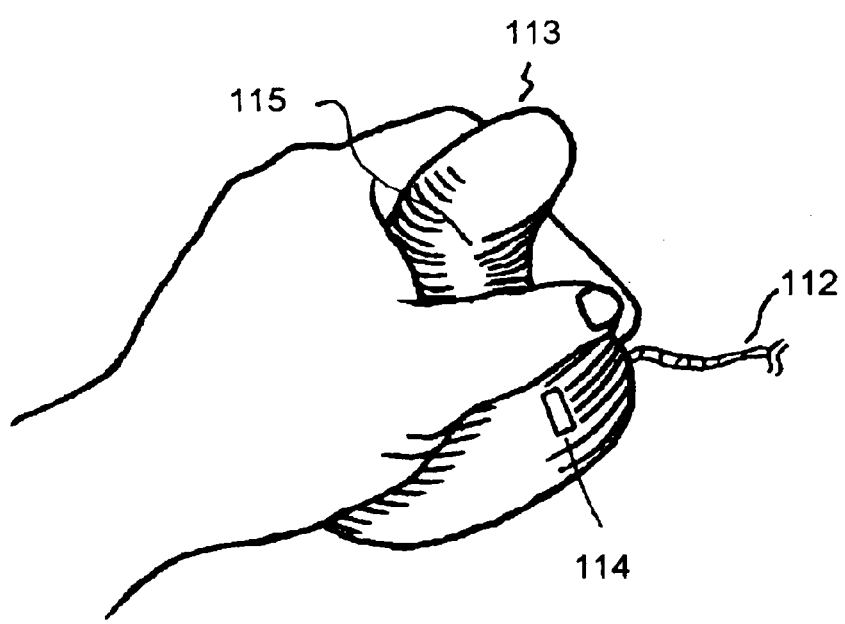
FIG. 6 is a right side view of a mirrored version of the ergonomically shaped computer pointing device for left hand operation.
Figure 7:
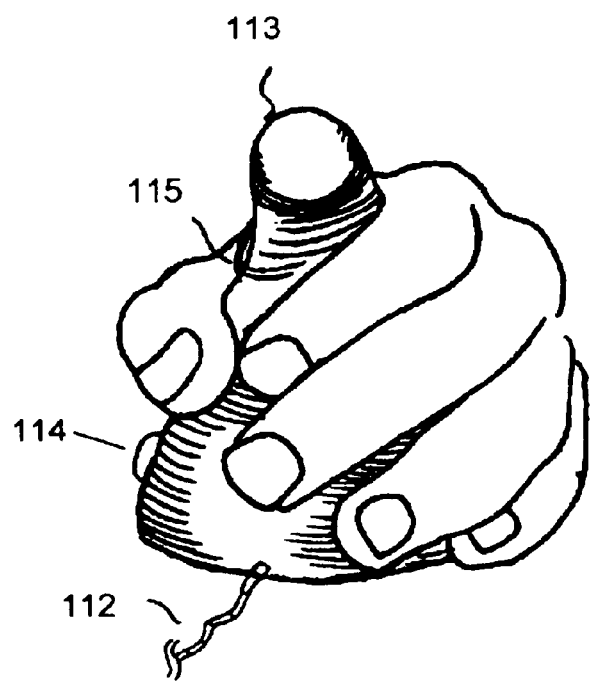
FIG. 7 is a front view of a mirrored version of the ergonomically shaped computer pointing device for left hand operation.

FIG. 6 and FIG. 7 show a left-handed embodiment, with mirrored placement of the buttons, such as 114, and the scroll wheel 115. It is entirely feasible to design an embodiment that is ambidextrous. For example, one can make the scroll wheel to be swappable, or have two scroll wheels with one on each side.

It is also important that when the scroll wheel and the buttons are activated, the fingers are engaged in a hooking action with the joints bending inward.

In summary, the ergonomic aspects of the pointing device include 1) allowing the hand to maintain a natural upright position throughout the operation, 2) allowing all five fingers to be naturally curved inward while the whole palm is holding the device, 3) allowing the little finger and the base of the palm to be half resting on the work surface and half pressed against the base of the device, 4) allowing activation of the buttons and the scroll wheel by the user pressing the first joints of the thumb and fingers instead of the finger tips, 5) activation of the buttons and the scroll wheel promotes an inward hooking of the fingers towards the palm, 6) fitting a wide range of hand or palm sizes.

The X-Y movement of the cursor in the computing device is effected by either a standard rolling ball 117 or an optical or gyroscopic sensor 117A that is mounted in the bottom or interior of the pointing device. The hand effects the X-Y movement while holding the pointing device in a natural and nearly upright position. This is an easy-to-adopt style of operation after an initial familiarization step.

It is also possible to implement the pointing device as a wireless input device that allows the user to effect X-Y movement in the free air and without the need to move against a surface. As noted above, it is also possible to use a gyroscope for translating left-right rotation to X-movement and front-back rotation to Y-movement.

Extra buttons and scrolling-wheel can be attached to the pointing device for auxiliary usage.

For example, the scrolling-wheel can be in front of the pointing device for scrolling with the index finger or middle finger.

Another embodiment is a QWERT keyboard that consists of one or a pair of pointing device handles on which the keys are arranged such that fingers type on them while keeping the hand in a natural upright position. A further embodiment is a combination of such keyboard and a pointing device of the invention.

While the invention has been described in relation to preferred embodiments of the invention, it will be appreciated that other embodiments, adaptations and modifications of the invention will be apparent to those skilled in the art.

We claim:

1. An ergonomic computer pointing device, comprising:
    a base having generally flat bottom surface for resting and translating upon a work surface;
    a generally forward tilting cone arising above said base;
    a tip extending from the top of the cone with further forward tilting than the cone;
    a plurality of buttons placed on the surface of the cone, with proper protrusion, such that the buttons can be conveniently pressed or rubbed respectively by a plurality of the joints, or areas near the joints, of the fingers and thumb during operation; and
    wherein the conic surface of said device allows contacts to the palm, the thumb, and the fingers simultaneously, while the side of the little finger and the base of the palm also lightly contact and glide over a work surface and the index finger contacts the necking area between the top tip and the cone of said device in a curled hooking position.

2. The computer pointing device defined in claim 1 wherein said base has a generally oval outline with the long axis generally in line with the direction of the user's forearm.

3. The computer pointing device defined in claim 1 wherein said base has a generally oval outline and said cone has a plurality of indentations or protrusions that do not result in any substantial differences in the contact surface areas between the cone and the palm and fingers of a user.

4. The computer pointing device defined in claim 1 wherein the general center of said device has an optical sensing unit for effecting X-Y movements of a computer's curser.

5. The computer pointing device defined in claim 1 wherein said means for sensing said mouse is a gyroscopic sensor in said housing such that a plurality of translational movements of a hand holding said device can effect the X-Y movement of said computer curser.

6. The computer pointing device defined in claim 1 wherein said conic surface allows contacts to the palm, thumb, and fingers simultaneously while the side of the little finger and the base of the palm also lightly contact and glide over said work surface and the index finger contacts the necking area between the top tip and the cone of said device in a curled hooking position.

7. In an ergonomic computer pointing device having a housing with a base having a generally flat bottom surface for resting and translating upon a work surface and a plurality of control buttons placed on the surface of said housing with proper protrusions such that said buttons can be conveniently pressed or rubbed respectively by a plurality of the joints, or areas near the joints, of the fingers and thumb of the user during operation: the improvement comprising said housing being a generally forward tilting cone rising above said base and having a tip extending from the top of said cone with further forward tilting than the cone; and wherein the conic surface of said device allows contacts to the palm, the thumb, and the fingers simultaneously, while the side of the little finger and the base of the palm also lightly contact and glide over a work surface and the index finger contacts the necking area between the top tip and the cone of said device in a curled hooking position.

* * * * *